US012670285B2

(12) United States Patent
Elnatour et al.

(10) Patent No.: US 12,670,285 B2
(45) Date of Patent: Jun. 30, 2026

(54) PRIVACY PROTECTED DATABASE QUERYING

(71) Applicant: Apple Inc., Cupertino, CA (US)

(72) Inventors: Deima Elnatour, Santa Clara, CA (US); Elli Shapiro, London (GB); Muhammad Mohsin K. Niazi, London (GB); Michael B. Wood, London (GB); Brandon J. Van Ryswyk, Los Altos, CA (US); Paul A. Youngblood, San Mateo, CA (US); Daniela S. Antonova, London (GB); Andrew M. Bennett, North Hollywood, CA (US); Alex B. McLaughlin, Santa Monica, CA (US); Sebastien P. Sahuc, Piedmont, CA (US); Cristian B. Opris, London (GB); Miguel Nunes De Miranda, London (GB)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 17/551,452

(22) Filed: Dec. 15, 2021

(65) Prior Publication Data

US 2022/0198050 A1 Jun. 23, 2022

Related U.S. Application Data

(60) Provisional application No. 63/129,463, filed on Dec. 22, 2020.

(51) Int. Cl.
*G06F 21/62* (2013.01)
*G06F 9/54* (2006.01)
*G06F 16/2455* (2019.01)

(52) U.S. Cl.
CPC ............ *G06F 21/6227* (2013.01); *G06F 9/54* (2013.01); *G06F 16/24556* (2019.01); *G06F 21/6245* (2013.01)

(58) Field of Classification Search
CPC .. G06F 21/6227; G06F 16/24556; G06F 9/54; G06F 21/6245
(Continued)

(56) References Cited

U.S. PATENT DOCUMENTS 8,538,973 B1 * 9/2013 Gonzalez ............ G06F 16/9537
707/758
10,025,645 B1 * 7/2018 Bastian ................... G06F 9/542
(Continued)

*Primary Examiner* — Gautam Sain
(74) *Attorney, Agent, or Firm* — Kilpatrick Townsend & Stockton LLP

(57) ABSTRACT

Systems, methods, and devices are described herein to query data in an entity data database. A query for information about a set of entities is received from a requesting system. The query is in a predefined format and includes search conditions. A querying strategy is determined based on the received query. The entity data database is queried by identifying a set of user records that fulfill a first search condition. A numerical value of the set of user records is next compared to a threshold. Depending on the numerical value, the set of user records is assigned to a first numerical bucket. Depending on the bucket, the numerical value is changed to a second numerical value, which is used to generate an aggregated count value. The aggregated count value is shared with the requesting system.

20 Claims, 8 Drawing Sheets

(58) Field of Classification Search
USPC ......................................................... 711/100
See application file for complete search history.

(56) References Cited

U.S. PATENT DOCUMENTS

| | | | |
|---|---|---|---|
| 10,853,424 B1* | 12/2020 | Mandaviya | .............. G06N 7/01 |
| 11,922,222 B1* | 3/2024 | Chawla | ................ G06F 9/5077 |
| 2010/0312884 A1* | 12/2010 | Nandy | ................. G06F 16/958 |
| | | | 709/224 |
| 2015/0007249 A1* | 1/2015 | Bezzi | ................. G06F 21/6227 |
| | | | 726/1 |
| 2015/0128287 A1* | 5/2015 | LaFever | ............. G06F 21/6254 |
| | | | 726/27 |
| 2016/0048897 A1* | 2/2016 | Somaiya | .............. G06F 16/338 |
| | | | 705/26.61 |
| 2021/0192068 A1* | 6/2021 | Rogers | ............... G06F 21/6227 |

* cited by examiner

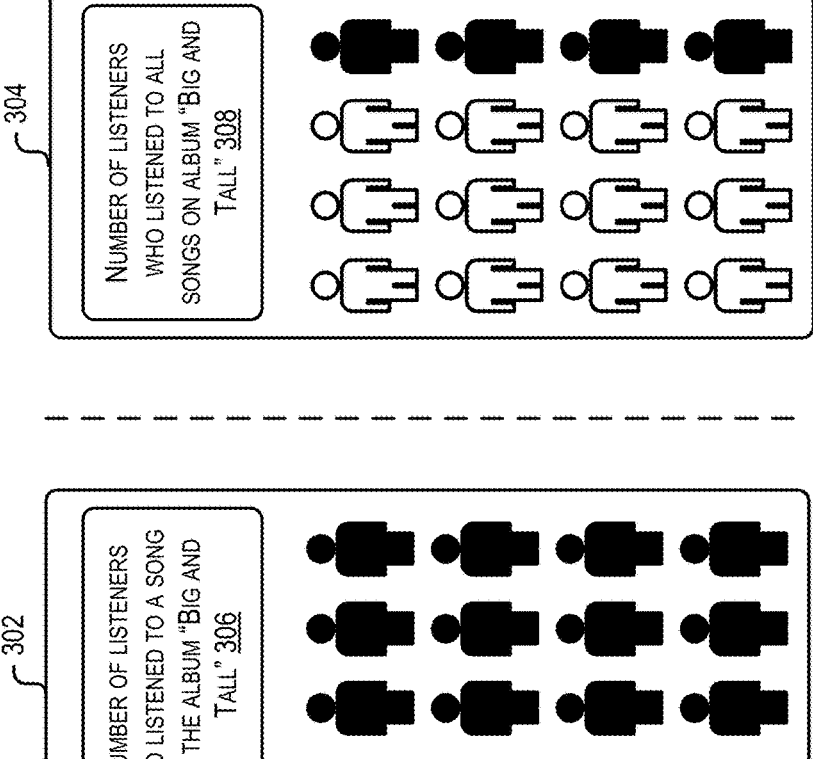
*FIG. 3*

400
402
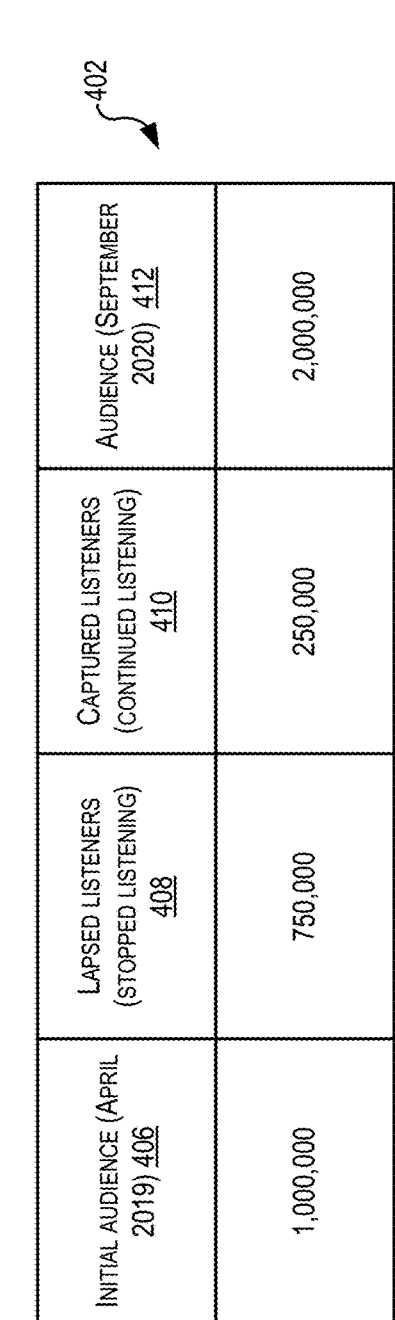
| Initial Audience (April 2019) 406 | Lapsed Listeners (Stopped Listening) 408 | Captured Listeners (Continued Listening) 410 | Audience (September 2020) 412 |
|---|---|---|---|
| 1,000,000 | 750,000 | 250,000 | 2,000,000 |
404
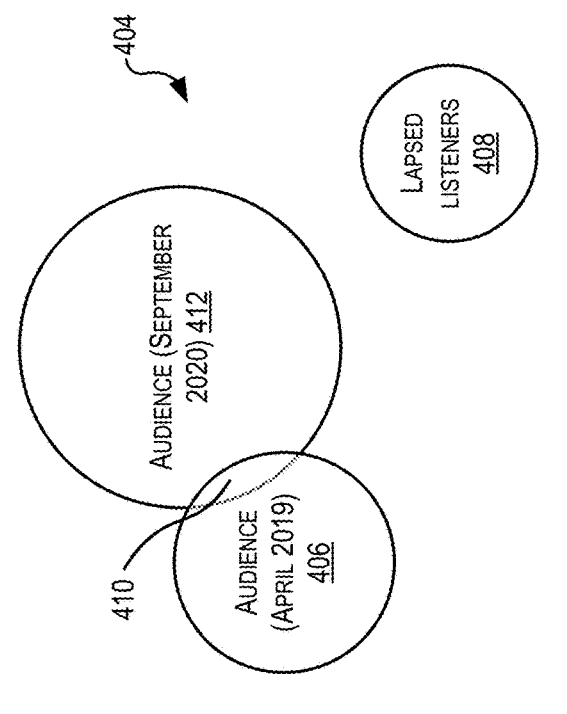
*FIG. 4*

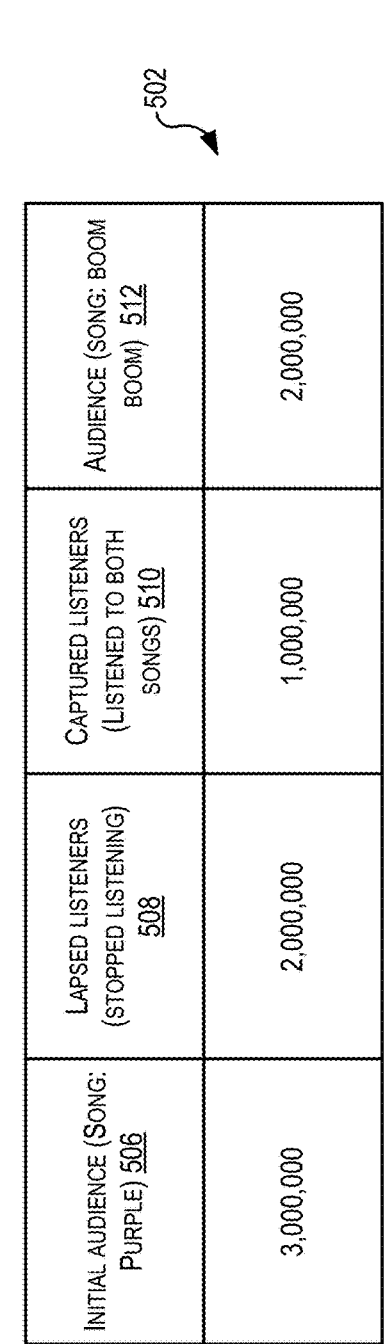
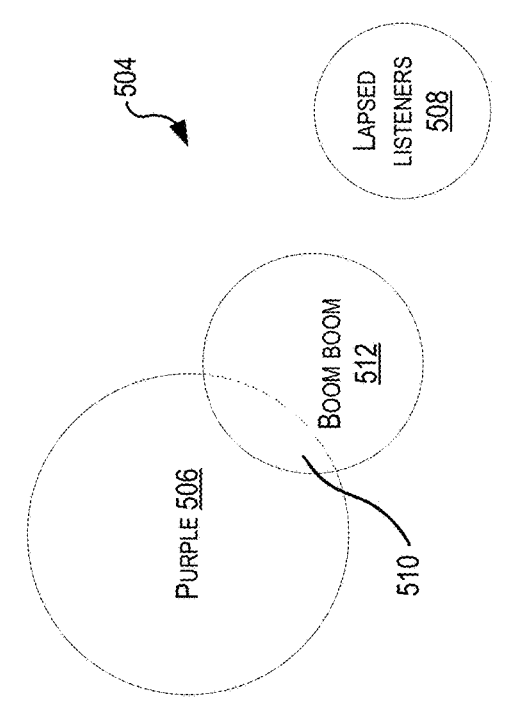
| INITIAL AUDIENCE (SONG: PURPLE) 506 | LAPSED LISTENERS (STOPPED LISTENING) 508 | CAPTURED LISTENERS (LISTENED TO BOTH SONGS) 510 | AUDIENCE (SONG: BOOM BOOM) 512 |
| --- | --- | --- | --- |
| 3,000,000 | 2,000,000 | 1,000,000 | 2,000,000 |
*FIG. 5*

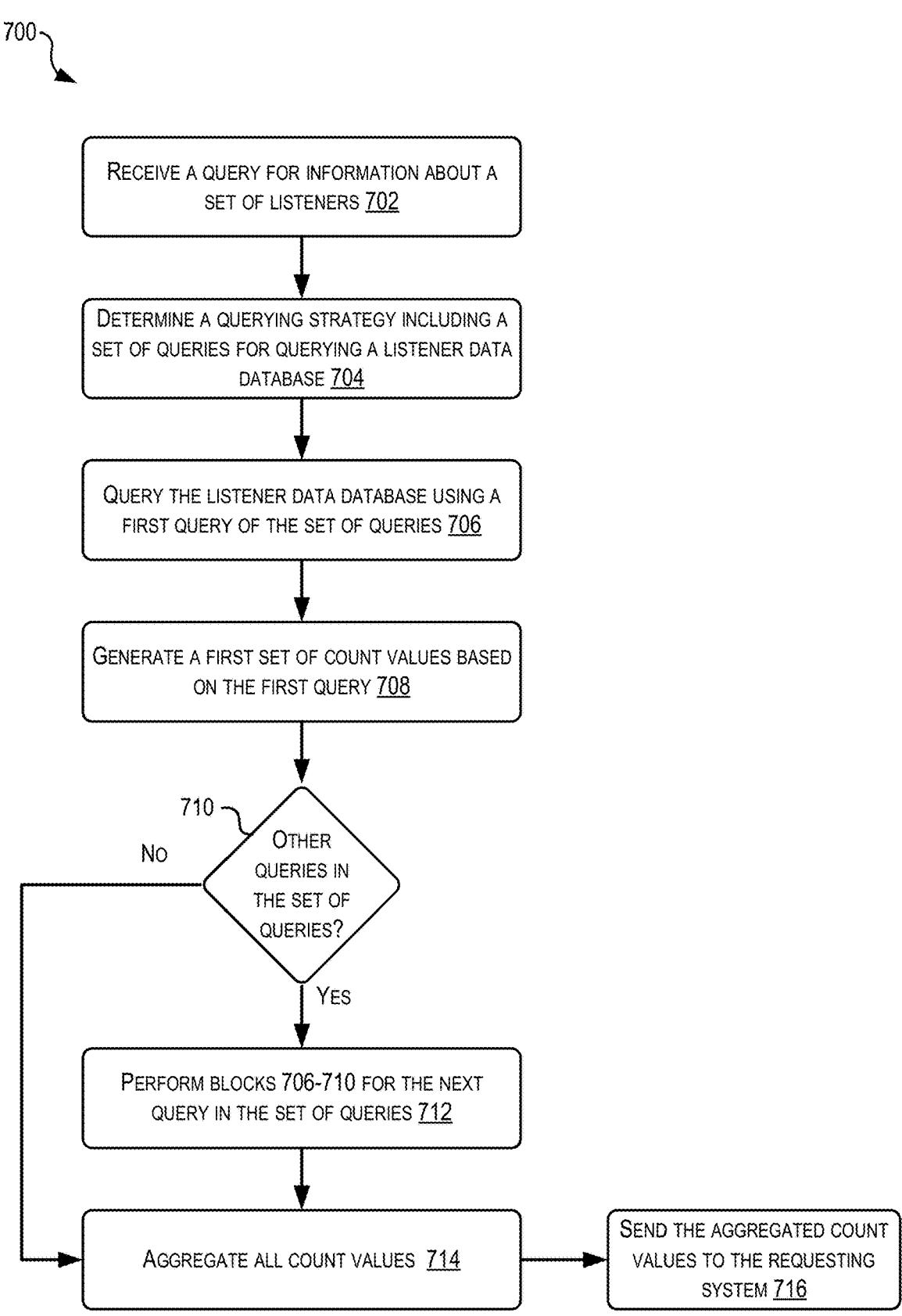

700

RECEIVE A QUERY FOR INFORMATION ABOUT A SET OF LISTENERS 702

DETERMINE A QUERYING STRATEGY INCLUDING A SET OF QUERIES FOR QUERYING A LISTENER DATA DATABASE 704

QUERY THE LISTENER DATA DATABASE USING A FIRST QUERY OF THE SET OF QUERIES 706

GENERATE A FIRST SET OF COUNT VALUES BASED ON THE FIRST QUERY 708

710 OTHER QUERIES IN THE SET OF QUERIES?

No

YES

PERFORM BLOCKS 706-710 FOR THE NEXT QUERY IN THE SET OF QUERIES 712

AGGREGATE ALL COUNT VALUES 714

SEND THE AGGREGATED COUNT VALUES TO THE REQUESTING SYSTEM 716

*FIG. 7*

PRIVACY PROTECTED DATABASE QUERYING

CROSS-REFERENCES TO RELATED APPLICATIONS

This application claims the benefit of U.S. Provisional Patent Application No. 63/129,463, filed Dec. 22, 2020, the entire disclosure of which is incorporated herein by reference for all purposes.

BACKGROUND

Advancements have been made in recent years that allow service providers, such as those that host music streaming services, to capture data about users of their services. This data can be used to improve the performance of the streaming services and may also be shared with partners. In some cases, however, the data may include sensitive information, which cannot be shared.

BRIEF DESCRIPTION OF THE DRAWINGS

FIG. 3 illustrates a diagram showing an example cohort of listeners obtained using a process for privacy protected querying of entity data databases, according to at least one example.

FIG. 4 illustrates a diagram showing an example cohort of listeners obtained using a process for privacy protected querying of entity data databases, according to at least one example.

FIG. 5 illustrates a diagram showing an example cohort of listeners obtained using a process for privacy protected querying of entity data databases, according to at least one example.

FIG. 7 illustrates a flowchart showing an example process for privacy protected querying of entity data databases, according to at least one example.

DETAILED DESCRIPTION

Figure 1:
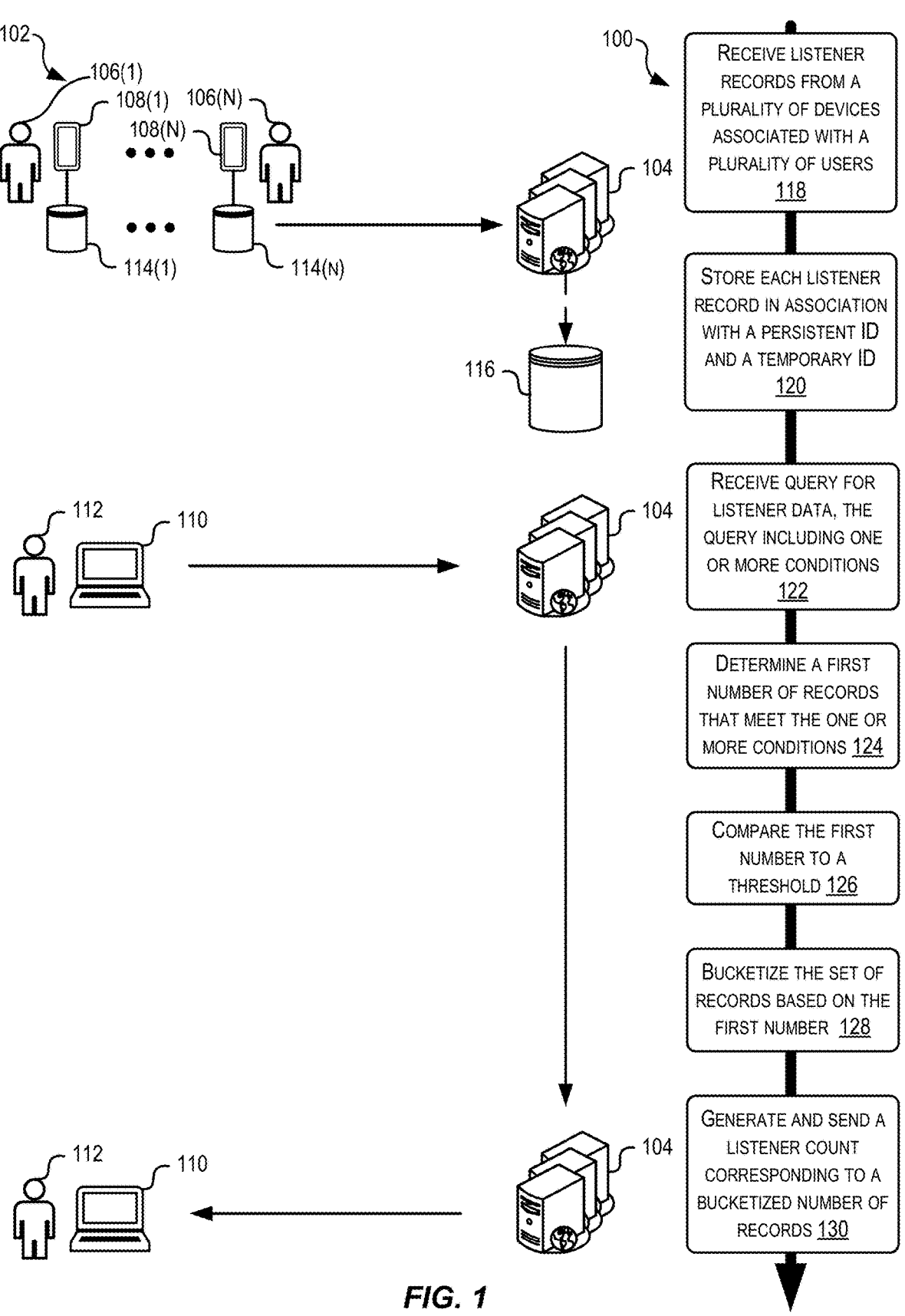
FIG. 1 illustrates a block diagram and a flowchart showing an example process for privacy protected querying of entity data databases, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, an entity analytics platform that includes methods, systems, devices, and computer-readable media that allow requesting systems to query a remote database of entity records using a predefined set of application programming interfaces (APIs) to obtain analytics data about entities. The entity records are associated with actual entities that engaged with a set of electronic content items, such as a set of songs, videos, and other such content. For example, the entities may be listeners that listen to songs via a music streaming platform using a web application, mobile application, or the like hosted by the same entity that maintains the database of listener records. The requesting system may be associated with a user at a record label or other comparable third-party entity that is interested to obtain analytical data about user engagement with its electronic content items. The querying and data collection may be performed in a manner that enables flexible queries to obtain aggregated, anonymized counts of entities and/or plays across several dimensions while also protecting listener privacy. Unlike conventional approaches that may share user data, the techniques described herein generate numerical counts of entities based on multiple different query conditions. To further protect entity privacy and reduce the possibility of requesting systems identifying entities from the numerical counts, the techniques described herein apply combinations of thresholding (e.g., comparing a numerical value against one or more thresholds), bucketizing (e.g., assigning a numerical value to one of a plurality of numerical buckets or ranges based on the numerical value), and rounding (e.g., changing a numerical value to a different numerical value) as part of executing the queries.

The examples of this specification are described with respect to entities that are listeners. The scope is not limited to listeners and engagement with music files. Rather, the techniques described herein may be applied to any platform that captures analytics data about its users (e.g., video streaming, social media interactions, web browsing history, shopping history, purchase history) and shares at least some part of that data with outside parties.

The techniques described herein allow requesting users (e.g., users at music labels) to write any number of queries to solve for multiple use cases. Each music label may have its own specialty and area of focus. The techniques described herein provide a standardized and syndicated system to empower music labels to analyze and understand listeners' behavior that engage with their content without compromising privacy, nor the reliability of the results.

The techniques described herein also provide near real-time, privacy-protected results. In particular, the system strikes a balance between two competing interests: giving requesting users specificity, but not so much so that the listeners become identifiable, and protecting listener's personally identifiable information. For example, the querying results should be specific enough for requesting users to have reliable insights that serve as the foundation for informed business decisions. To accomplish this, the system uses a predefined mathematical range where rounding up or down is applied to the requested results.

The techniques described herein also strike a balance between an additional two interests: flexibility and control. If more flexibility is granted to requesting users, then there is less control with data usage. The system strikes this balance between flexibility and control by allowing requesting users to write essentially any query on the entire dataset associated with their electronic content items while controlling the possibilities with the use of endpoints. The queries are directed to specifically engineered endpoints that allow a requesting user to create advanced and complex queries only within the data provided at each endpoint.

Turning now to a particular example, in this example, a service provider hosts music files that are owned by a music label. The service provider provides applications that enable listeners to listen to the music files. The service provider also provides a system whereby a representative of the music label can obtain play counts and other related analytics data for the music files that belong to the label. To begin, the representative uses their user device to access a querying tool provided by the service provider to generate queries for accessing listener data using set of predefined endpoints. A query may include multiple conditions across multiple data dimensions. Once the service provider receives the query, the service provider processes the query in a privacy-protected manner and identifies which user listener records meet the conditions. The number of records that meet the conditions are then summed and compared to a threshold. If the number does not exceed the threshold (e.g., twenty five), the system will not return any results. If the threshold is exceeded, the number of records is then bucketized (e.g., assigned to a particular bucket defined by a range of values) based on the number of records. Depending on which bucket the number of records corresponds to, the system will round the number of records up or round the number of records down to some predefined values. The system may then provide the rounded number to the user device associated with the label representative. The combination of sophisticated querying and generating counts (rather than sharing user data) enables the label to obtain sophisticated and meaningful insights from the data without the service provider having to compromise listener privacy.

Turning now to the figures, FIG. 1 illustrates a block diagram 102 and a flowchart showing an example process 100 for privacy protected querying of entity data databases, according to at least one example. The diagram 102 corresponds to a system including a service provider 104, listeners 106(1)-106(N) (hereinafter listener 106 or listeners 106) who use their user devices 108(1)-108(N) (hereinafter user device 108 or user devices 108) to listen to music files, and a requesting device 110, operated by a requesting user 112, to request information about the listeners 106. The listener 106 is an example of an entity. Other examples of entities include viewers of video content, shoppers who use shopping application, and any other user that engages with electronic content items or otherwise performs actions within an application, web browser, or the like.

The service provider 104 hosts applications that enable the listeners 106 to access the music via one or more applications that enable streaming and/or downloading of music or other electronic content items, such as videos. The service provider 104 may obtain the music content from one or more music labels, artists, studios, or the like that produce the music content. It should be understood, however, that although the specification describes the examples with respect to music files, the techniques described herein may be applied to any platform that captures analytics data about its users (e.g., video streaming, social media interactions, web browsing history, shopping history, purchase history) and shares at least some part of that data with outside parties.

In addition to providing the music content, the applications may collect data about the listening habits of the listeners 106. This collected data may be stored in on-device databases such as device entity data databases 114(1)-114(N) (hereinafter device entity data database 114 or device entity data databases 114). The user devices 108 may periodically share the collected data with the service provider 104 via any suitable network connection. In some examples, the collected data is shared with the service provider 104 at or during a content delivery session in which the service provider 104 serves music content to the user device 108. In some examples, the applications may enable the service provider 104 to collect the data about listening habits without the on-device applications capturing and storing that data in the device entity data databases 114. In any event, once the service provider 104 receives the listener data, the service provider can process the data and store them in an entity data database 116 (see block 118 of the process 100).

The user device 108 is any suitable electronic user device capable of communicating with the service provider 104 over a network, such as the Internet, a cellular network, or any other suitable network, as described above. In some examples, the user device 108 may be a smartphone, laptop computer, wearable device, desktop computer, tablet, set-top box, streaming box, or other user device on which specialized applications can operate (e.g., a music streaming application). The user device 108 is associated with or otherwise operated by the listener 106. An electronic user profile of the listener 106 may be uniquely associated with the user device 108. In some examples, the service provider 104 may maintain a database of user information that includes a persistent identifier associated with the user profile of the listener 106. In some examples, the data within the entity data database 116 may be stored in connection with a temporary identifier and/or the persistent identifier. The temporary identifier may also uniquely identify the user profile, but may change periodically (e.g., every month, every week, every day, every year). The listener 106 is an example of a listener whose listener data is the subject of this specification.

Like the user device 108, the requesting device 110 is also any suitable electronic user device capable of communicating with the service provider 104 over a network, such as the Internet, a cellular network, or any other suitable network. The requesting device 110 can take the same form as the user device 108. In some examples, the requesting device 110 communicates with the service provider 104 via a web-based application, website, or the like that provides a querying user interface for obtaining information and building queries for querying the listener data stored by the service provider 104 in the entity data database 116. The requesting user 112 is any suitable user associated with the requesting device 110. In some examples, the requesting user 112 is an employee of a music label and is authorized to query listener data on behalf of the music label. As part of querying the listener data, user credentials submitted by the requesting user 112 may be authenticated (e.g., as part of a sign-in procedure). Queries sent to the service provider 104 by the requesting device 110 may include some identifier that the requesting user 112 has been authenticating.

Figure 6:
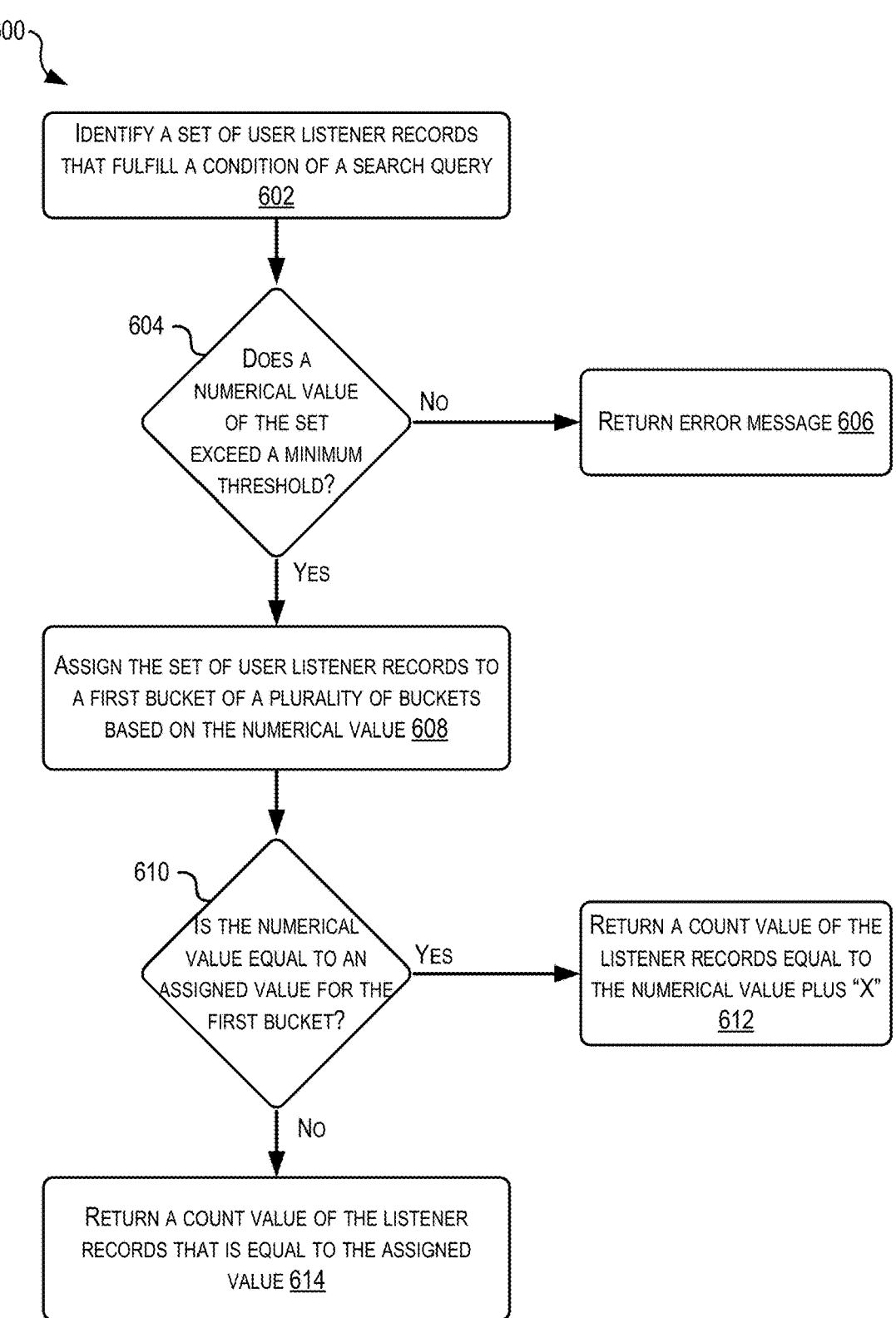
FIG. 6 illustrates a flowchart showing an example process for privacy protected querying of entity data databases, according to at least one example.

FIGS. 1, 6, and 7 illustrate example flow diagrams showing processes 100, 600, and 700, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 may be performed by the service provider 104 (e.g., an application or other engine such as an analytics engine described elsewhere herein). The process 100 begins at block 118 by the service provider 104 receiving listener records from a plurality of devices (e.g., the user devices 108) associated with a plurality of users (e.g., the users 106). The listener records are associated with the plurality of users by way of user profiles. In particular, as the listener 106 listens to music provided by the service provider 104 or a different entity, data about the user's 106 listening is recorded in association with the user's profile. This data is then shared with the service provider 104 at block 118. In some examples, as described previously, the user device 108 may store the listener records in the device entity data database 114 prior to sending the listener records to the service provider 104.

At block 120, the process 100 includes the service provider 104 storing each listener record in association with a persistent user identifier and/or a temporary user identifier. In some examples, the storing may be within the entity data database 116. The persistent user identifier may be used by the service provider 104 to uniquely identify a profile of the listener 106. For example, this may include a multi-bit alphanumeric code that is generated at the time the user first creates an account with the service provider 104. In some examples, the persistent user identifier may accessed when the listener 106 accesses the streaming service described herein and any other services provided by the service provider 104 (e.g., video streaming service, data storage service, payment services). The temporary user identifier may be changed by the service provider 104 at some fixed or arbitrary interval. For example, a new temporary user identifier may be generated monthly and saved in association with the user profile. The temporary user identifier may be shared in some instances with parties outside of the service provider 104. Because the temporary user identifier is changed periodically, it may make it difficult for a nefarious (or other user) to identify the real-life person associated with the temporary user identifier.

At block 122, the process 100 includes the service provider 104 receiving a query for listener data, the query including one or more search conditions. The query may have originated from the requesting device 110 and the requesting user 112. The one or more search conditions may function as one or more constraints on the search by identifying the type of data attributes, a time period of interest, a comparison to other data records, and other such constraints relating to the listener data that the requesting user 112 is interested in obtaining. The query may be received at an API endpoint of the service provider 104. For example, the requesting device 110 may direct the query to the particular API endpoint by inputting a unique address (e.g., uniform resource identifier) of the endpoint in the query. The set of conditions eligible to be included among the one or more search conditions may depend on the API endpoint. For example, some endpoints may be built to provide certain types of data or certain combinations of data. The query may be received via a querying user interface provided by the service provider 104. The querying user interface may provide fields for collecting information from the requesting user 112 in order to build a query that meets the requirements of a particular endpoint.

At block 124, the process 100 includes the service provider 104 determining a first number of records that meet the one or more search conditions. This may include the service provider 104 executing the query received at block 122. When a listener records meets the one or more search conditions, the service provider 104 may record a count for the record. If a listener record does not meet the one or more search conditions, the service provider 104 may not count the record or may otherwise ignore the record.

At block 126, the process 100 includes the service provider 104 comparing the first number to a threshold. This thresholding step may include the service provider 104 determining whether the total number of listener records counted at block 124 meets or exceeds the threshold. The value of the threshold may be selected to ensure that some minimum number of records are included in the search result so as to avoid overly specific results that could be used to identify the user(s) identified in the results. For example, the threshold, in some examples, may be 25. In other examples, the threshold may be greater than 25 or less than 25.

At block 128, the process 100 includes the service provider 104 bucketizing the set of records based on the first number. In this example, bucketing the set of records may include picking a bucket to which the first number belongs based on the value of the first number. For example, each bucket may be associated with values separated by an interval of 50 (e.g., 25-75, 75-125, 125-175, and any other suitable interval). If the value of the first number falls within the 25-75 bucket (e.g., if the first value were 62), the value of the first number may be reassigned to be a fixed value within the 25-75 bucket. In this example, the fixed value is 50 for the 25-75 bucket. Thus, even though the value of the first number determined at block 124 may have been 62, the bucketizing block at 128 changes the value to 50. In this manner, the actual 62 records (e.g., 62 unique user profiles) that were identified at block 124 are obfuscated by the adjustment to 50.

At block 130, the process 100 includes the service provider 104 generating and sending a listener count corresponding to the bucketized number of records. This may include the service provider 104 sending a message to the requesting device 110 that includes the value determined at block 128.

Figure 2:
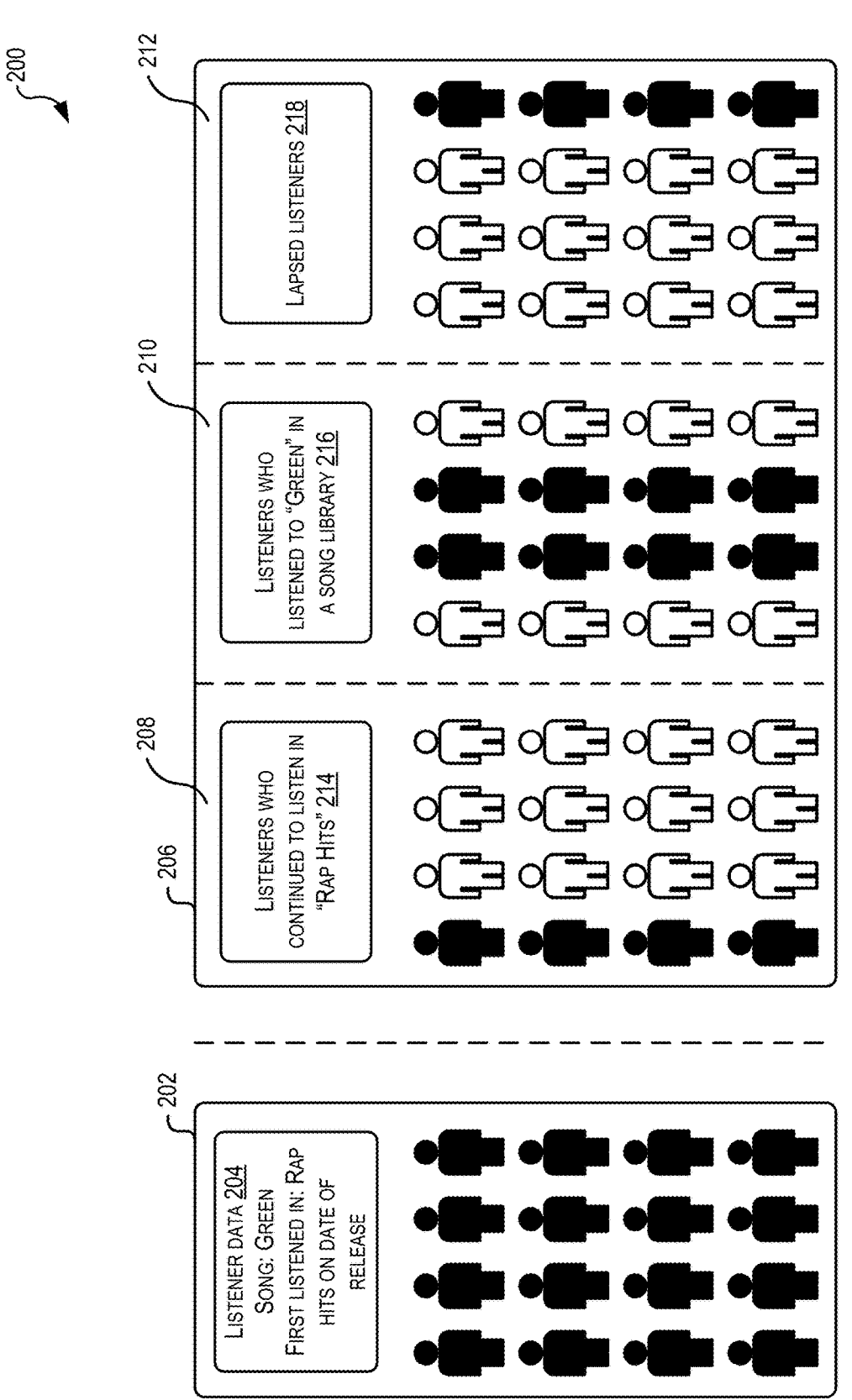
FIG. 2 illustrates a diagram showing an example cohort of listeners obtained using a process for privacy protected querying of entity data databases, according to at least one example.

FIG. 2 illustrates a diagram 200 showing an example cohort of listeners obtained using a process for privacy protected querying of entity data databases, according to at least one example. The diagram 200 in particular identifies in which area of a streaming services users discovered a particular song during a first period (e.g., via a curated playlist, via a station, via the artist's page, song library), whether the users continue to listen to the song during a second period, and, if so, using which area of the streaming service. In some examples, the cohorting and corresponding counts identified in the diagram 200 may be obtained by querying a particular API endpoint.

The diagram 200 includes a first set of listeners 202 associated with a first set of listener data 204. The first set of listeners 202 may have been identified using a first query, such as one described herein. The listener data 204 for the first set of listeners 202 indicates that these listeners first listened to the song "Green" in the playlist "Rap Hits" on the date of release. In the diagram 200, the filled in user shapes represent listeners that meet all the conditions of the particular query. Thus, in this example, all listeners in the first set of listeners first listened to the song "Green" in the playlist "Rap Hits" on the date of release.

The second set of listener data 206, includes three subsets of listeners 208, 210, and 212. The three subsets of listeners 208, 210, and 212 may have been identified using a query, such as one described herein. Each subset of the subsets of listeners 208-212 represents listeners who took some action with respect to the song "Green." For example, characteristics of the subset of listeners 208 may be identified by listener data 214, which indicates that these listeners are those who continued to listen to "Green" via the playlist "Rap Hits." Thus, the listeners in the subset of listeners 208 discovered the song "Green" via the playlist "Rap Hits" on release day (or some other first period) and at a later period continued to listen to the song "Green" in the same area of the service.

Characteristics of the subset of listeners 210 may be identified by listener data 216, which indicates that these listeners are those who continued to listen to the song "Green" via a song library. Thus, the listeners in the subset of listeners 210 discovered the song "Green" via the playlist "Rap Hits" on release day (or some other first period) and at a later period continued to listen to the song "Green" in a different area of the service. The song library may represent an area of the service where the listeners can search for songs, artists, and albums. Thus, the listeners in the subset of listeners 210 may represent users that more actively seek out the artist and the song "Green" as compared to other listeners, such as those in 208, that listen to the song as part of a curated playlist.

Characteristics of the subset of listeners 212 may be identified by listener data 218, which indicates that these listeners have lapsed with respect to the song "Green." This may mean that these listeners did not listen to the song during the second period.

FIG. 3 illustrates a diagram 300 showing an example cohort of listeners obtained using a process for privacy protected querying of entity data databases, according to at least one example. The diagram 300 in particular identifies the number of listeners who listened to a song on a particular album and the number of listeners who listened to the entire particular album. In some examples, the cohorting and corresponding counts identified in the diagram 300 may be obtained by querying a particular API endpoint.

The diagram 300 includes a set of listeners 302 and a subset of listeners 304. The subset of listeners 304 are a subset of the set of listeners 302. The set of listeners 302 and the subset of listeners 304 may have been identified using a query, such as one described herein. Listener data 306 of the set of listeners 302 identifies characteristics of the set of listeners 302. In particular, the listener data 306 identifies that the set of listeners 302 includes the number of listeners who listened to a song on the album entitled "Big and Tall." In some examples, the set of listeners 302 includes the number of listeners who listened to a particular song on the "Big and Tall." Listening data 308 of the subset of listeners 304 identifies characteristics of the subset of listeners 304. In particular, the listener data 308 identifies that the subset of listeners 304 includes the number of listeners (of the set of listeners 302) who listened to all songs on the album "Big and Tall."

FIG. 4 illustrates a diagram 400 showing an example cohort of listeners obtained using a process for privacy protected querying of entity data databases, according to at least one example. The diagram 400 in particular includes a table 402 and graphical diagram 404 that depict an initial audience of a particular song during a first period, whether the initial audience has grown or shrunk during a second period, and a current audience during a second period. In some examples, the cohorting and corresponding counts identified in the diagram 400 may be obtained by querying a particular API endpoint. The information in the diagram 400 and diagram 500 may be graphically depicted like the information in the diagrams 200 and 300, and vice versa.

The table 402 includes counts 406-412. The count 406 includes a count of an initial audience for a particular song during the time period of April 2019. The count 406 may represent listeners who listened to the song (or at least a portion of the song) during April 2019. The initial audience is 1,000,000. The count 408 includes a count of lapsed listeners that totals 750,000. The lapsed listeners are listeners that stopped listening to the song and represent a subset of the set of listeners that formed the initial audience. The count 410 includes a count of captured listeners that totals 250,000. The captured listeners are listeners that continued to listen to the song and/or the artist during the second period and represent a subset of the set of listeners that formed the initial audience. Finally, the count 412 includes a count of a total audience during the time period of September 2020. The count 412 includes the captured listeners represented by the count 410 and other listeners that may have found the artist and/or the particular using other approaches. This may indicate that the artist's initial audience was grown, at least in part, by how the particular song was marketed or otherwise promoted. The diagram 404 represents the counts 406-412 from above, but in a graphical format.

FIG. 5 illustrates a diagram 500 showing an example cohort of listeners obtained using a process for privacy protected querying of entity data databases, according to at least one example. The diagram 500 in particular includes a table 502 and graphical diagram 504 that depict an initial audience of a first song during a first period and an audience of a second song by the same artist. The counts depicted in the diagram 500 can be used to determine whether the second later song was listened to by fans of the first song, general fans of the artist, and/or fans of the second song. In some examples, the cohorting and corresponding counts identified in the diagram 500 may be obtained by querying a particular API endpoint. The information in the diagram 400 and diagram 500 may be graphically depicted like the information in the diagrams 200 and 300 and vice versa.

The table 502 includes counts 506-512. The count 506 includes a count of an initial audience for a particular song "Purple." This count is equal to 3,000,000. The count 506 represents listeners who listened to the song "Purple" during some first period. The count 508 includes a count of lapsed listeners, e.g., those that stopped listening to the song "Purple." The amount of the count 508 is 2,000,000. The count 512 represents listeners who listened to the song "boom boom" during a second period. The song "boom boom" may be by the same artist that performed "Purple." The amount of the count 512 is 2,000,000. Finally, the count 510 represents listeners that listened to both songs, "Purple" and "boom boom." The count 510 is 1,000,000, which represents that the song "boom boom" is more popular with fans of the artist, rather than fans just of the song "Purple."

Other insights may be drawn from this data as well. The diagram 504 represents the counts 506-512 from above, but in a graphical format.

FIG. 6 illustrates a flow chart showing an example process 600 for privacy protected querying of entity data databases, according to at least one example. The process 600, in particular, relates to the process for ensuring listeners privacy when the service provider 104 queries the entity data database. Thus, in this example, the service provider 104 (FIG. 1) may perform the process 600.

The process 600 begins at block 602 by the service provider 104 identifying a set of user listener records that fulfill a condition of a search query. In some examples, more than one condition is used. For example a set of conditions may correspond to a set of search input parameters, constraints, and the like for conducting the search. In some examples, at least one condition may be applied after the query has been executed to filter the set of results. In some examples, the service provider 104 may determine the search query based on a query received at an API endpoint from a requesting device.

At block 604, the process 600 includes the service provider 104 determining whether a numerical value of the set of user listeners records exceed a minimum threshold. This is at least one measure provided by the service provider 104 to ensure listener privacy. In this case, the threshold may be set as a minimum because, if the numerical value is less than the threshold, it may be too simple to identify the particular listeners associated each count. For example, the minimum threshold may be set at some value, such as 50. In this example, if the search results include 50 or fewer hits (e.g., counts), then the service provider 104 would return an error message, such as described with respect to block 606. If the search results exceed the threshold, the service provider 104 proceeds to block 608.

At block 608, the process 600 includes the service provider 104 assigning the set of user listener records to a first bucket of a plurality of buckets based on the numerical value. This is at least one additional measure provided by the service provider 104 to ensure listener privacy. In this case, each bucket may be assigned some numerical range, e.g., 50-100,101-150,151-200, and an assigned value for each bucket (e.g., 75 for 50-100,125 for 101-150,175 for 151-200). The block 608 may include picking the bucket whose range includes the numerical value. In this example, if the numerical value were 55 (e.g., a value greater than the minimum threshold), the bucket including 50-100 may be picked because 55 falls within the range of 50-100. Once the bucket range is known, the process 600 includes the service provider 104, at 610, determining whether the numerical value is equal to an assigned value for the first bucket.

Continuing with the example from above, if the numerical value were 75, e.g., the same value as the range of 50-100, the process 600 would continue to block 612. At block 612, the process 600 includes the service provider 104 returning a count value of the listener records equal to the numerical value (e.g., 75) plus some arbitrary value X, which may be predefined or may be computed on the fly based on a set of rules. The set of rules may define that the value X may not cause the count value to go outside of the range identified at block 608. Continuing with the example from above, if the numerical value were 75, the service provider 104 may add or subtract some value from 75 that is less than or equal to 1241.

If at block 610 it is determined that the numerical value is not equal to the assigned value for the bucket, the process 600 proceeds to block 614. At block 614, the process 600 includes the service provider 104 returning a count value of the listener records that is equal to the assigned value for the bucket. Thus, if the numerical value were 70, the service provider 104 may return a count value of 75, e.g., 70 would be rounded up to 75 by the service provider 104. This approach may further obfuscate the listeners associated with the count values.

FIG. 7 illustrates a flow chart showing an example process 700 for privacy protected querying of entity data databases, according to at least one example. The process 700, in particular, relates to the process for executing a first query of a set of queries to generate a set of count values. Thus, in this example, the service provider 104 (FIG. 1) may perform the process 700

The process 700 may begin at 702 by the service provider 104 receiving a query for information about a set of listeners. The query may correspond to a predefined endpoint format and may include one or more search conditions associated the predefined endpoint format. The predefined endpoint format may define a set of functions and a set of procedures for the requesting system to query a particular application programming interface (API) endpoint. In some examples, the particular API endpoint is one of a plurality of API endpoints accessible by the requesting system depending on the predefined endpoint format corresponding to the query.

At block 704, the process 700 includes the service provider 104 determining a querying strategy including a set of queries for querying an entity data database. Determining the querying strategy may be based at least in part on the query received at block 702. In some examples, the querying strategy may define a set of queries for the predefined endpoint format and the one or more search conditions.

At block 706, the process 700 includes the service provider 104 querying the entity data database using a first query of the set of queries. Querying the entity data database may include performing the process 600, described herein. For example, this may include identifying a set of user listener records in the entity data database that fulfill a first condition of the one or more search conditions, determining that a first numerical value of the set of user listener records meets or exceeds a first numerical threshold, assigning the set of user listener records to a first numerical bucket of a plurality of numerical buckets based at least in part on the first numerical value, and changing the first numerical value to a second numerical value based at least in part on assigning the set of user listener records to the first numerical bucket. In this example, the first numerical value may have a value within a range of numerical values of the first numerical bucket. In some examples, each user listener record of the set of user listener records may be associated with a persistent record identifier and a temporary record identifier. In some examples, each persistent record identifier may uniquely identify a listener associated with a corresponding user listener record. In some examples, each temporary record identifier may uniquely identify a listener associated with a corresponding user listener record. In some examples, each temporary record identifier may be changed periodically. In some examples, each temporary record identifier may uniquely identify a listener associated with a corresponding user listener record.

In some examples, identifying the set of user listener records in the entity data database may include identifying the set of user listener records based at least in part on at least one of a persistent identifier corresponding to each user listener record or a temporary record identifier corresponding to each user listener record.

In some examples, each listener record of the set of listener records may include a plurality of listening instances, each associated with a plurality of data attributes. In some examples, the plurality of data attributes may include two or more of a content item play data attribute, a location data attribute, a content item origination data attribute, a plurality of demographic data attributes, or a subscription data attribute.

At block 708, the process 700 includes the service provider 104 generating a set of aggregated count values based on the first query. In some examples, the set of aggregated count values may be for the set of queries and may be based on the second numerical value of the set of user listener records. In some examples, generating the set of aggregated count values may include excluding a persistent record identifier corresponding to each user listener record from the set of aggregated count values. This approach may ensure listener privacy.

At block 710, the process 700 includes the service provider 104 determining whether there are others queries in the set of queries left to execute. Because the set of queries may include more than one query, the queries may be performed in series or in parallel. The determination at block 710 may be performed to determine whether all queries generated at 704 have been performed. In some examples, the query received at block 702 may be multi-part and/or require querying the entity data database to identify a first set of data, then executing a second query to filter the first set of data and/or to further query on the first set of data.

If the answer at 710 is Yes, the process 700 may continue to block 712. At block 712, the process 700 may include performing blocks 706-710 for the next query in the set of queries. After which, the process 700 continues to block 714. At block 714, the process 700 includes the service provider 104 aggregating all count values, such as those determined at block 708. In some examples, the count values may be aggregated without regard for user listener data associated with the records that are counted at block 708.

In some examples, the one or more search conditions may correspond to a listening approach in which listeners first started listening to a particular electronic content item during a first period, and the set of aggregated count values may identify a number of the listeners who are still listening to the particular electronic content item using the listening approach during a second time period. In some examples, the one or more search conditions may correspond to listeners who listened to a particular electronic content item on an album of electronic content items, and the set of aggregated count values may identify a number of the listeners who listened to all electronic content items on the album. In some examples, the one or more search conditions may correspond to an initial audience who listened to a particular electronic content item during a first period, and the set of aggregated count values may identify a current audience of an artist during a second period.

At block 716, the process 700 includes the service provider 104 sending the aggregated count values to the requesting system. This may include sending the count values over a network and formatted according to some predefined format, such as a JavaScript Object Notation (JSON) file or other suitable format. Returning to block 710, if the answer at block 710 is No, the process 700 may continue to block 714.

In some examples, the process 700 may further include determining a set of identifying data associated with the set of user listener records, and excluding the set of identifying data from the set of aggregated count values. In this manner, the set of aggregated count values may be devoid of personally identifying information.

In some examples, the process 700 may further include querying the entity data database using a second query of the set of queries by at least: identifying a subset of the set of user listener records in the entity data database that fulfill a second condition of the one or more search conditions, determining that a third numerical value of the subset of user listener records meets or exceeds a numerical threshold, assigning the subset of user listener records to the first numerical bucket or a second numerical bucket of the plurality of numerical buckets based at least in part on the third numerical value, and changing the third numerical value to a fourth numerical value based at least in part on assigning the subset of user listener records to the first numerical bucket or the second numerical bucket. The third numerical value may have a value within a range of numerical values of the first numerical bucket or the second numerical bucket. In some examples, generating the set of aggregated count values for the set of queries may include generating the set of aggregated count values using the fourth numerical value of the subset of user listener records.

In some examples, the process 700 may further include querying the entity data database using a second query of the set of queries by at least: identifying a second set of user listener records in the entity data database that fulfill a second condition of the one or more search conditions, determining that a third numerical value of the second set of user listener records meets or exceeds a second numerical threshold, assigning the subset of user listener records to the first numerical bucket or a second numerical bucket of the plurality of numerical buckets based at least in part on the third numerical value, and changing the third numerical value to a fourth numerical value based at least in part on assigning the second set of user listener records to the first numerical bucket or the second numerical bucket. In this example, the third numerical value may have a value within a range of numerical values of the first numerical bucket or the second numerical bucket. In this example, generating the set of aggregated count values for the set of queries may include generating the set of aggregated count values using the fourth numerical value of the second set of user records.

Figure 8:
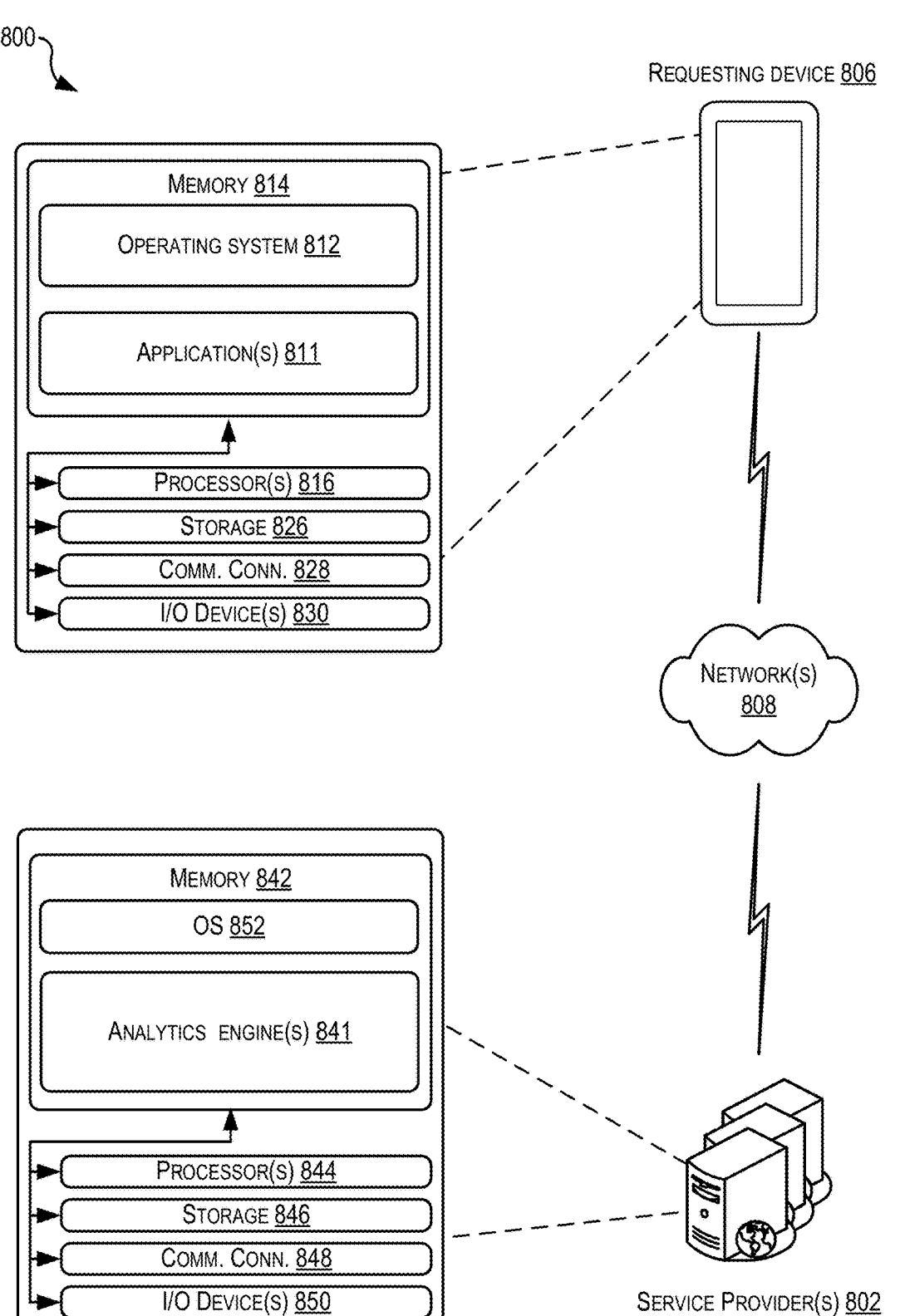
FIG. 8 illustrates a simplified block diagram depicting an example architecture for implementing the techniques described herein, according to at least one example.

FIG. 8 illustrates an example architecture or environment 800 configured to implement techniques described herein, according to at least one example. In some examples, the example architecture 800 may further be configured to enable a user device 806 and service provider computer 802 to share information. The service provider computer 802 is an example of the service provider 104. The user device 806 is an example of the user devices 108 and 110. In some examples, the devices may be connected via one or more networks 808 (e.g., via Bluetooth, WiFi, the Internet). In some examples, the service provider computer 802 may be configured to implement at least some of the techniques described herein with reference to the user device 806 and vice versa.

In some examples, the networks 808 may include any one or a combination of many different types of networks, such as cable networks, the Internet, wireless networks, cellular networks, satellite networks, other private and/or public networks, or any combination thereof. While the illustrated example represents the user device 806 accessing the service provider computer 802 via the networks 808, the described techniques may equally apply in instances where the user device 806 interacts with the service provider computer 802 over a landline phone, via a kiosk, or in any other manner. It is also noted that the described techniques may apply in other client/server arrangements (e.g., set-top boxes), as well as in non-client/server arrangements (e.g., locally stored applications, peer-to-peer configurations).

As noted above, the user device 806 may be any type of computing device, such as, but not limited to, a mobile phone, a smartphone, a personal digital assistant (PDA), a laptop computer, a desktop computer, a thin-client device, a tablet computer, a wearable device, such as a smart watch, or the like. In some examples, the user device 806 may be in communication with the service provider computer 802 via the network 808, or via other network connections.

In one illustrative configuration, the user device 806 may include at least one memory 814 and one or more processing units (or processor(s)) 816. The processor(s) 816 may be implemented as appropriate in hardware, computer-executable instructions, firmware, or combinations thereof. Computer-executable instruction or firmware implementations of the processor(s) 816 may include computer-executable or machine-executable instructions written in any suitable programming language to perform the various functions described. The user device 806 may also include geo-location devices (e.g., a global positioning system (GPS) device or the like) for providing and/or recording geographic location information associated with the user device 806.

The memory 814 may store program instructions that are loadable and executable on the processor(s) 816, as well as data generated during the execution of these programs. Depending on the configuration and type of the user device 806, the memory 814 may be volatile (such as random-access memory (RAM)) and/or non-volatile (such as read-only memory (ROM), flash memory). The user device 806 may also include additional removable storage and/or non-removable storage 826 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 814 may include multiple different types of memory, such as static random-access memory (SRAM), dynamic random-access memory (DRAM), or ROM. While the volatile memory described herein may be referred to as RAM, any volatile memory that would not maintain data stored therein once unplugged from a host and/or power would be appropriate.

The memory 814 and the additional storage 826, both removable and non-removable, are all examples of non-transitory computer-readable storage media. For example, non-transitory computer-readable storage media may include volatile or non-volatile, removable or non-removable media implemented in any method or technology for storage of information, such as computer-readable instructions, data structures, program modules, or other data. The memory 814 and the additional storage 826 are both examples of non-transitory computer-storage media. Additional types of computer-storage media that may be present in the user device 806 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 806. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 806 may also contain communications connection(s) 828 that allow the user device 806 to communicate with a data store, another computing device or server, user terminals, and/or other devices via the network 808. The user device 806 may also include I/O device(s) 830, such as a keyboard, a mouse, a pen, a voice input device, a touch screen input device, a display, speakers, and/or a printer.

Turning to the contents of the memory 814 in more detail, the memory 814 may include an operating system 812 and/or one or more application programs or services for implementing the features disclosed herein such as applications 811 (e.g., mobile application, browser application, music application). Similarly, at least some techniques described with reference to the service provider computer 802 may be performed by the user device 806.

The service provider computer 802 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, or a virtual machine instance. In some examples, the service provider computer 802 may be in communication with the user device 806 via the network 808 or via other network connections.

In one illustrative configuration, the service provider computer 802 may include at least one memory 842 and one or more processing units (or processor(s)) 844. The processor(s) 844 may be implemented as appropriate in hardware, computer-executable instructions, firmware, or combinations thereof. Computer-executable instruction or firmware implementations of the processor(s) 844 may include computer-executable or machine-executable instructions written in any suitable programming language to perform the various functions described.

The memory 842 may store program instructions that are loadable and executable on the processor(s) 844, as well as data generated during the execution of these programs. Depending on the configuration and type of service provider computer 802, the memory 842 may be volatile (such as RAM) and/or non-volatile (such as ROM, flash memory). The service provider computer 802 may also include additional removable storage and/or non-removable storage 846 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 842 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 842 and the additional storage 846, both removable and non-removable, are both additional examples of non-transitory computer-readable storage media.

The service provider computer 802 may also contain communications connection(s) 848 that allow the service provider computer 802 to communicate with a data store, another computing device or server, user terminals, and/or other devices via the network 808. The service provider computer 802 may also include I/O device(s) 850, such as a keyboard, a mouse, a pen, a voice input device, a touch input device, a display, speakers, and/or a printer.

Turning to the contents of the memory 842 in more detail, the memory 842 may include an operating system 852 and/or one or more application programs or services for implementing the features disclosed herein, such as an analytics engine 841. The analytics engine 841 may be configured to implement the processes 100, 600, and 700 described herein.

The various examples can be further implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybase®, and IBM®.

The environment can include a variety of data stores and other memory and storage media, as discussed above. These can reside in a variety of locations, such as on a storage medium local to (and/or resident in) one or more of the computers or remote from any or all of the computers across the network. In a particular set of examples, the information may reside in a storage-area network (SAN), familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, and/or flash cards.

Such devices can also include a computer-readable storage media reader, a communications device (e.g., a modem, a network card (wireless or wired), an infrared communication device), and working memory as described above. The computer-readable storage media reader can be connected with, or configured to receive, a non-transitory computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from those described above. For example, customized hardware might also be used and/or particular elements might be implemented in hardware, software (including portable software, such as applets), or both. Further, connection to other computing devices, such as network input/output devices, may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information, such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but, on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known for carrying out the disclosure. Variations of those preferred examples may become apparent to those of ordinary skill in the art upon reading the foregoing description. It is expected that skilled artisans will be able to employ such variations as appropriate, and the intent is for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and sharing of analytics data of listeners of a streaming service. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter ID's, home addresses, data or records relating to a user's listening habits, health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's listening experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of or access to personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, using one or more processors, comprising:

receiving, from a requesting system, a first query for information about a set of entities corresponding to a predefined endpoint format and comprising a search condition associated with the predefined endpoint format;

determining, based at least in part on the first query, a set of queries for the predefined endpoint format;

identifying, for each query in the set of queries, a corresponding set of user entity records in an entity data database that fulfills the search condition;

determining, for each query in the set of queries, a corresponding first numerical value corresponding to a number of user entity records of the corresponding set of user entity records;

identifying, for at least a subset of queries of the set of queries, a corresponding first predefined numerical value range of a plurality of predefined numerical value ranges that the corresponding first numerical value falls within;

identifying, for each query in the subset of queries, a corresponding second numerical value that falls within the corresponding first predefined numeral value range;

changing, for each query in the subset of queries, the corresponding first numerical value to the corresponding second numerical value;

generating, based at least in part on the corresponding second numerical value associated with each query in the subset of queries, a set of aggregated count values; and transmitting the set of aggregated count values to the requesting system.

2. The computer-implemented method of claim 1, wherein each user entity record of the corresponding set of user entity records is associated with a persistent record identifier and a temporary record identifier.

3. The computer-implemented method of claim 2, wherein:

each persistent record identifier uniquely identifies an entity associated with a corresponding user entity record; and generating the set of aggregated count values comprise excluding the persistent record identifier corresponding to each user entity record from the set of aggregated count values.

4. The computer-implemented method of claim 2, wherein:

each temporary record identifier uniquely identifies an entity associated with a corresponding user entity record;

generating the set of aggregated count numerical values comprise including the temporary record identifier corresponding to each user entity record with the set of aggregated count numerical values.

5. The computer-implemented method of claim 1, wherein identifying the corresponding set of user entity records in the entity data database comprises identifying the corresponding set of user entity records based at least in part on at least one of a persistent identifier corresponding to each user entity record or a temporary record identifier corresponding to each user entity record.

6. The computer-implemented method of claim 1, further comprising:

determining a set of identifying data associated with the corresponding set of user entity records; and excluding the set of identifying data from the corresponding second numerical value.

7. The computer-implemented method of claim 1, further comprising determining whether the corresponding first numerical value meets or exceeds a first numerical threshold, wherein identifying the first predefined numerical value range occurs after determining that the corresponding first numerical value meets or exceeds the first numerical threshold.

8. The computer-implemented method of claim 1, further comprising determining whether the corresponding first numerical value is the same as a first predefined numerical value that falls within the first predefined numerical value range, wherein changing the corresponding first numerical value to the corresponding second numerical value is based at least in part on whether the corresponding first numerical value and the first predefined numerical value are the same.

9. The computer-implemented method of claim 8, wherein, when the corresponding first numerical value is different than the first predefined numerical value, the corresponding second numerical value is a second predefined numerical value that falls within the first predefined numerical value range.

10. The computer-implemented method of claim 8, wherein, when the corresponding first numerical value is the same as the first predefined numerical value, changing the corresponding first numerical value to the corresponding second numerical value includes changing the corresponding first numerical value by adding a third numerical value.

11. The computer-implemented method of claim 10, wherein:

the first predefined numerical value range includes a range of numerical values between a lowest value and a highest value; and the third numerical value is less than or equal to a difference between the highest value and the lowest value.

12. The computer-implemented method of claim 1, wherein the corresponding first numerical value is a total of the number of user entity records of the set of user entity records.

13. The computer-implemented method of claim 1, wherein:

the query corresponds to a set of search conditions; and the search condition is a first search condition of the set of search conditions.

14. One or more non-transitory computer-readable media comprising computer-executable instructions that, when executed by one or more processors, cause a computer system to perform operations, comprising:

receiving, from a requesting system, a first query for information about a set of entities corresponding to a predefined endpoint format and comprising a search condition associated with the predefined endpoint format;

determining, based at least in part on the first query, a set of queries for the predefined endpoint format;

identifying, for each query in the set of queries, a corresponding set of user entity records in an entity data database that fulfills the search condition;

determining, for each query in the set of queries, a corresponding first numerical value corresponding to a number of user entity records of the corresponding set of user entity records;

identifying, for at least a subset of queries of the set of queries, a corresponding first predefined numerical value range of a plurality of predefined numerical value ranges that the corresponding first numerical value falls within;

identifying, for each query in the subset of queries, a corresponding second numerical value that falls within the corresponding first predefined numeral value range;

changing, for each query in the subset of queries, the corresponding first numerical value to the corresponding second numerical value;

generating, based at least in part on the corresponding second numerical value associated with each query in the subset of queries, a set of aggregated count values; and transmitting the set of aggregated count values to the requesting system.

15. The one or more non-transitory computer-readable media of claim 14, wherein the predefined endpoint format defines a set of functions and a set of procedures for the requesting system to query a particular application programming interface (API) endpoint.

16. The one or more non-transitory computer-readable media of claim 15, wherein the particular API endpoint is one of a plurality of API endpoints accessible by the requesting system depending on the predefined endpoint format corresponding to the first query.

17. A system comprising:

a memory configured to store computer-executable instructions; and a processor configured to access the memory and execute the computer-executable instructions to at least:

receive, from a requesting system, a first query for information about a set of entities corresponding to a predefined endpoint format and comprising a search condition associated with the predefined endpoint format;

determine, based at least in part on the first query, a set of queries for the predefined endpoint format;

identify, for each query in the set of queries, a corresponding set of user entity records in an entity data database that fulfills the search condition;

determine, for each query in the set of queries, a corresponding first numerical value corresponding to a number of user entity records of the corresponding set of user entity records;

identify, for at least a subset of queries of the set of queries, a corresponding a first predefined numerical value range of a plurality of predefined numerical value ranges that the corresponding first numerical value falls within;

identify, for each query in the subset of queries, a corresponding second numerical value that falls within the corresponding first predefined numerical value range;

change, for each query in the subset of queries, the corresponding first numerical value to the corresponding second numerical value;

generate, based at least in part on the corresponding second numerical value associated with each query in the subset of queries, a set of aggregated count values; and transmit the set of aggregated count values to the requesting system.

18. The system of claim 17, wherein:

each user entity record of the corresponding set of user entity records comprises a plurality of data attributes; and the plurality of data attributes comprises one or more of a content item play data attribute, a location data attribute, a content item origination data attribute, a plurality of demographic data attributes, or a subscription data attribute.

19. The system of claim 17, wherein the search condition corresponds to an engagement approach in which entities first started engaging with a particular electronic content item during a first period, and the set of aggregated count values identify a number of the entities who are still engaging with the particular electronic content item using the engagement approach during a second time period.

20. The system of claim 17, wherein the search condition corresponds to entities who engaged with a particular electronic content item in a collection of electronic content items, and the corresponding second numerical value identifies a number of the entities who engaged with all electronic content items in the collection of electronic content items.

* * * * *